(12) United States Patent
Borleske et al.

(10) Patent No.: US 7,427,927 B2
(45) Date of Patent: Sep. 23, 2008

(54) IN-HOME DISPLAY COMMUNICATES WITH A FIXED NETWORK METER READING SYSTEM

(75) Inventors: Andrew J. Borleske, Garner, NC (US);
Kenneth C. Shuey, Zebulon, NC (US);
Robert T. Mason, Jr., Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 26 days.

(21) Appl. No.: 11/355,548

(22) Filed: Feb. 16, 2006

(65) Prior Publication Data

US 2007/0200729 A1     Aug. 30, 2007

(51) Int. Cl.
*G08B 23/00* (2006.01)
(52) U.S. Cl. .................... 340/870.02; 340/870.03; 702/60; 705/412
(58) Field of Classification Search ............ 340/870.02, 340/870.03; 702/60; 705/412
See application file for complete search history.

(56) References Cited

U.S. PATENT DOCUMENTS

| | | | |
|---|---|---|---|
| 3,445,815 A | 5/1969 | Saltzberg et al. ............ 340/163 |
| 3,858,212 A | 12/1974 | Tompkins et al. ..... 343/100 CS |
| 3,878,512 A | 4/1975 | Kobayashi et al. ...... 340/168 R |
| 3,973,240 A | 8/1976 | Fong .......................... 340/151 |
| 4,031,513 A | 6/1977 | Simciak .................... 340/152 T |
| 4,056,107 A | 11/1977 | Todd et al. .................... 130/27 |
| 4,066,964 A | 1/1978 | Costanza et al. .............. 325/55 |
| 4,132,981 A | 1/1979 | White ......................... 340/203 |
| 4,190,800 A | 2/1980 | Kelly, Jr. et al. ............... 325/37 |
| 4,204,195 A | 5/1980 | Bogacki ...................... 340/151 |
| 4,218,737 A | 8/1980 | Buscher et al. ............. 364/493 |
| 4,250,489 A | 2/1981 | Dudash et al. .............. 340/147 |
| 4,254,472 A | 3/1981 | Juengel et al. .............. 364/900 |
| 4,319,358 A | 3/1982 | Sepp ............................. 375/1 |
| 4,321,582 A | 3/1982 | Banghart .................... 340/310 |
| 4,322,842 A | 3/1982 | Martinez .................... 370/204 |

(Continued)

FOREIGN PATENT DOCUMENTS

CH         682196 A5    7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner*—Albert K Wong
(74) *Attorney, Agent, or Firm*—Woodcock Washburn LLP

(57) ABSTRACT

A display system that communicates with existing automated meter reading communications systems to provide information to a user. The display includes a radio that listens to communications between a utility meter and the reading system. When the display recognizes a particular utility meter identifier, it captures meter read information and stores it in memory. The information may then be presented to the user. Alternatively, a broadcast message may be communicated, that when received by the display, causes the display to extract information from the receiver. A manual override button may be provided to allow a user to manually request information from the meter. The display will extract information from the meter upon receipt of the manual request.

21 Claims, 4 Drawing Sheets

U.S. PATENT DOCUMENTS

| | | | |
|---|---|---|---|
| 4,328,581 A | 5/1982 | Harmon et al. ............... 371/8 |
| 4,361,851 A | 11/1982 | Asip et al. .................... 358/84 |
| 4,361,890 A | 11/1982 | Green, Jr. et al. ............. 375/1 |
| 4,396,915 A | 8/1983 | Farnsworth et al. ..... 340/870.03 |
| 4,405,829 A | 9/1983 | Rivest et al. ............. 178/22.14 |
| 4,415,896 A | 11/1983 | Allgood ................. 340/870.03 |
| 4,466,001 A | 8/1984 | Moore et al. ............. 340/825.08 |
| 4,504,831 A | 3/1985 | Jahr et al. ............... 340/870.03 |
| 4,506,386 A | 3/1985 | Ichikawa et al. ............ 455/343 |
| 4,513,415 A | 4/1985 | Martinez ..................... 370/92 |
| 4,525,861 A | 6/1985 | Freeburg ..................... 455/33 |
| 4,600,923 A | 7/1986 | Hicks et al. ............ 340/870.02 |
| 4,608,699 A | 8/1986 | Batlivala et al. ............. 375/216 |
| 4,611,333 A | 9/1986 | McCallister et al. ........... 375/1 |
| 4,614,945 A | 9/1986 | Brunius et al. ......... 340/870.03 |
| 4,617,566 A | 10/1986 | Diamond ............... 340/870.11 |
| 4,628,313 A | 12/1986 | Gombrich et al. ....... 340/870.02 |
| 4,631,538 A | 12/1986 | Carreno ................. 340/870.18 |
| 4,638,298 A | 1/1987 | Spiro ......................... 340/827 |
| 4,644,321 A | 2/1987 | Kennon ..................... 340/310 |
| 4,653,076 A | 3/1987 | Jerrim et al. ................. 375/115 |
| 4,672,555 A | 6/1987 | Hart et al. .................... 700/276 |
| 4,680,704 A | 7/1987 | Konicek et al. ............. 364/525 |
| 4,688,038 A | 8/1987 | Giammarese .......... 340/870.02 |
| 4,692,761 A | 9/1987 | Robinton .................... 340/825 |
| 4,707,852 A | 11/1987 | Jahr et al. .................... 379/107 |
| 4,713,837 A | 12/1987 | Gordon ...................... 379/93 |
| 4,724,435 A | 2/1988 | Moses et al. ........... 340/870.13 |
| 4,728,950 A | 3/1988 | Hendrickson et al. .. 340/870.31 |
| 4,734,680 A | 3/1988 | Gehman et al. ............. 340/539 |
| 4,749,992 A | 6/1988 | Fitzemeyer et al. .... 340/870.02 |
| 4,757,456 A | 7/1988 | Benghiat ..................... 364/464 |
| 4,769,772 A | 9/1988 | Dwyer ....................... 364/300 |
| 4,783,748 A | 11/1988 | Swarztrauber et al. ...... 364/483 |
| 4,792,946 A | 12/1988 | Mayo ......................... 370/338 |
| 4,799,059 A | 1/1989 | Grindahl et al. ........ 340/870.03 |
| 4,804,938 A | 2/1989 | Rouse et al. ................. 340/310 |
| 4,804,957 A | 2/1989 | Selph et al. ............ 340/870.03 |
| 4,811,011 A | 3/1989 | Sollinger ............... 340/870.02 |
| 4,827,514 A | 5/1989 | Ziolko et al. ................... 380/48 |
| 4,833,618 A | 5/1989 | Verma et al. ................. 364/483 |
| 4,839,645 A | 6/1989 | Lill ....................... 340/870.17 |
| 4,841,545 A | 6/1989 | Endo et al. ...................... 375/1 |
| 4,860,379 A | 8/1989 | Schoeneberger et al. ......... 455/5 |
| 4,862,493 A | 8/1989 | Venkataraman et al. ..... 379/107 |
| 4,868,877 A | 9/1989 | Fischer ......................... 380/25 |
| 4,884,021 A | 11/1989 | Hammond et al. .......... 324/142 |
| 4,912,722 A | 3/1990 | Carlin ............................ 375/1 |
| 4,922,518 A | 5/1990 | Gordon et al. ................. 379/57 |
| 4,939,726 A | 7/1990 | Flammer et al. ........... 370/94.1 |
| 4,940,974 A | 7/1990 | Sojka .................... 340/825.08 |
| 4,940,976 A | 7/1990 | Gastouniotis et al. .. 340/870.02 |
| 4,958,359 A | 9/1990 | Kato .............................. 375/1 |
| 4,964,138 A | 10/1990 | Nease et al. .................... 375/1 |
| 4,965,533 A | 10/1990 | Gilmore ....................... 331/18 |
| 4,972,507 A | 11/1990 | Lusignan ...................... 455/51 |
| 5,007,052 A | 4/1991 | Flammer ................... 370/85.6 |
| 5,018,165 A | 5/1991 | Sohner et al. ................... 375/1 |
| 5,022,046 A | 6/1991 | Morrow, Jr. .................... 375/1 |
| 5,032,833 A | 7/1991 | Laporte ................. 340/825.02 |
| 5,053,766 A | 10/1991 | Ruiz-del-Portal et al. ..................... 340/870.02 |
| 5,053,774 A | 10/1991 | Schuermann et al. ......... 342/44 |
| 5,056,107 A | 10/1991 | Johnson et al. ................. 375/1 |
| 5,067,136 A | 11/1991 | Arthur et al. ................... 375/1 |
| 5,079,715 A | 1/1992 | Venkataraman et al. ..... 364/481 |
| 5,079,768 A | 1/1992 | Flammer ................... 370/94.1 |
| 5,086,292 A | 2/1992 | Johnson et al. ............. 340/637 |
| 5,086,385 A | 2/1992 | Launey ....................... 364/188 |
| 5,090,024 A | 2/1992 | Vander Mey et al. ........... 375/1 |
| 5,111,479 A | 5/1992 | Akazawa ....................... 375/1 |
| 5,115,433 A | 5/1992 | Baran et al. ................ 370/94.3 |
| 5,115,448 A | 5/1992 | Mori ............................ 375/1 |
| 5,129,096 A | 7/1992 | Burns .......................... 455/18 |
| 5,130,987 A | 7/1992 | Flammer .................... 370/103 |
| 5,132,985 A | 7/1992 | Hashimoto et al. ............. 375/1 |
| 5,136,614 A | 8/1992 | Hiramatsu et al. .............. 375/1 |
| 5,142,694 A | 8/1992 | Jackson et al. ............. 455/67.1 |
| 5,151,866 A | 9/1992 | Glaser et al. ................ 364/483 |
| 5,155,481 A | 10/1992 | Brennan, Jr. et al. ... 340/870.02 |
| 5,160,926 A | 11/1992 | Schweitzer, III ....... 340/870.02 |
| 5,166,664 A | 11/1992 | Fish .......................... 340/539 |
| 5,177,767 A | 1/1993 | Kato ............................ 375/1 |
| 5,179,376 A | 1/1993 | Pomatto ................. 340/870.02 |
| 5,189,694 A | 2/1993 | Garland ..................... 379/106 |
| 5,194,860 A | 3/1993 | Jones et al. ........... 340/370.02 |
| 5,197,095 A | 3/1993 | Bonnett ..................... 379/107 |
| 5,204,877 A | 4/1993 | Endo et al. ..................... 375/1 |
| 5,214,587 A | 5/1993 | Green ................... 364/464.04 |
| 5,225,994 A | 7/1993 | Arinobu et al. ............. 364/492 |
| 5,228,029 A | 7/1993 | Kotzin ....................... 370/95.1 |
| 5,229,996 A | 7/1993 | Bäckström et al. ........ 370/100.1 |
| 5,239,575 A | 8/1993 | White et al. ................. 379/107 |
| 5,239,584 A | 8/1993 | Hershey et al. ................. 380/28 |
| 5,243,338 A | 9/1993 | Brennan, Jr. et al. ... 340/870.02 |
| 5,252,967 A | 10/1993 | Brennan et al. ......... 340/870.02 |
| 5,260,943 A | 11/1993 | Comroe et al. ............. 370/95.1 |
| 5,270,704 A | 12/1993 | Sosa Quintana et al. ..................... 340/870.02 |
| 5,280,498 A | 1/1994 | Tymes et al. ................... 375/1 |
| 5,280,499 A | 1/1994 | Suzuki ........................... 375/1 |
| 5,285,469 A | 2/1994 | Vanderpool ................... 375/1 |
| 5,287,287 A | 2/1994 | Chamberlain et al. ....... 364/483 |
| 5,289,497 A | 2/1994 | Jacobson et al. ............... 375/1 |
| 5,295,154 A | 3/1994 | Meier et al. ................... 375/1 |
| 5,307,349 A | 4/1994 | Shloss et al. ............... 370/85.2 |
| 5,311,541 A | 5/1994 | Sanderford, Jr. ............... 375/1 |
| 5,311,542 A | 5/1994 | Eder ............................ 375/1 |
| 5,315,531 A | 5/1994 | Oravetz et al. .............. 364/550 |
| 5,319,679 A | 6/1994 | Bagby ....................... 375/106 |
| 5,329,547 A | 7/1994 | Ling ............................ 375/1 |
| 5,345,225 A | 9/1994 | Davis ......................... 340/635 |
| 5,359,625 A | 10/1994 | Vander Mey et al. ........... 375/1 |
| 5,377,222 A | 12/1994 | Sanderford, Jr. ............... 375/1 |
| 5,381,462 A | 1/1995 | Larson et al. ................ 379/107 |
| 5,383,134 A | 1/1995 | Wrzesinski ................. 364/514 |
| 5,384,712 A | 1/1995 | Oravetz et al. ............... 364/550 |
| 5,387,873 A | 2/1995 | Muller et al. ................ 327/155 |
| 5,390,360 A | 2/1995 | Scop et al. ................. 455/34.2 |
| 5,406,495 A | 4/1995 | Hill ........................... 364/483 |
| 5,416,917 A | 5/1995 | Adair et al. ................. 395/500 |
| 5,420,799 A | 5/1995 | Peterson et al. ............. 364/483 |
| 5,428,636 A | 6/1995 | Meier ........................ 375/202 |
| 5,430,759 A | 7/1995 | Yokev et al. ................. 375/202 |
| 5,432,507 A | 7/1995 | Mussino et al. ......... 340/870.03 |
| 5,432,815 A | 7/1995 | Kang et al. ................. 375/200 |
| 5,438,329 A | 8/1995 | Gastouniotis et al. .. 340/870.02 |
| 5,448,230 A | 9/1995 | Schanker et al. ........ 340/870.03 |
| 5,448,570 A | 9/1995 | Toda et al. ................. 370/95.3 |
| 5,450,088 A | 9/1995 | Meier et al. ................. 342/51 |
| 5,452,465 A | 9/1995 | Geller et al. ................ 395/800 |
| 5,455,533 A | 10/1995 | Köllner ..................... 327/484 |
| 5,455,544 A | 10/1995 | Kechkaylo ................. 332/103 |
| 5,455,569 A | 10/1995 | Sherman et al. ........ 340/825.02 |
| 5,455,822 A | 10/1995 | Dixon et al. .................. 370/18 |
| 5,457,713 A | 10/1995 | Sanderford, Jr. et al. .... 375/206 |
| 5,461,558 A | 10/1995 | Patsiokas et al. ............ 364/145 |
| 5,463,657 A | 10/1995 | Rice ........................... 375/200 |
| 5,473,322 A | 12/1995 | Carney ................... 340/870.02 |
| 5,475,742 A | 12/1995 | Gilbert ....................... 379/106 |
| 5,475,867 A | 12/1995 | Blum ....................... 455/53.1 |
| 5,479,442 A | 12/1995 | Yamamoto ................. 375/206 |
| 5,481,259 A | 1/1996 | Bane ..................... 340/870.03 |
| 5,488,608 A | 1/1996 | Flammer, III ............ 370/85.13 |

| Patent | Date | Inventor | Class |
|---|---|---|---|
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,521,910 A | 5/1996 | Matthews | 370/54 |
| 5,522,044 A | 5/1996 | Pascucci et al. | 395/200.06 |
| 4,749,992 A | 6/1996 | Fitzmeyer et al. | 340/870.02 |
| 5,524,280 A | 6/1996 | Douthitt et al. | 455/62 |
| 5,525,898 A | 6/1996 | Lee, Jr. et al. | 324/142 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,570,084 A | 10/1996 | Ritter et al. | 340/825.05 |
| 5,572,438 A | 11/1996 | Ehlers et al. | 364/492 |
| 5,574,657 A | 11/1996 | Tofte et al. | 364/510 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,617,084 A | 4/1997 | Sears | 331/176 |
| 5,619,192 A | 4/1997 | Ayala | 340/870.02 |
| 5,619,685 A | 4/1997 | Schiavone | 395/500 |
| 5,621,629 A | 4/1997 | Hemminer et al. | 363/56 |
| 5,627,759 A | 5/1997 | Bearden et al. | 364/483 |
| 5,631,636 A | 5/1997 | Bane | 340/825.69 |
| 5,636,216 A | 6/1997 | Fox et al. | 370/402 |
| 5,640,679 A | 6/1997 | Lundqvist et al. | 455/33.2 |
| 5,659,300 A | 8/1997 | Dresselhuys et al. | 340/870.02 |
| 5,668,803 A | 9/1997 | Tymes et al. | 370/312 |
| 5,668,828 A | 9/1997 | Sanderford, Jr. et al. | 375/202 |
| 5,673,252 A | 9/1997 | Johnson et al. | 370/449 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,696,903 A | 12/1997 | Mahany | 395/200.58 |
| 5,699,276 A | 12/1997 | Roos | 364/514 A |
| 5,714,931 A | 2/1998 | Petite et al. | 340/539 |
| 5,715,390 A | 2/1998 | Hoffman et al. | 395/188.01 |
| 5,717,604 A | 2/1998 | Wiggins | 364/514 C |
| 5,719,564 A | 2/1998 | Sears | 340/870.02 |
| 5,745,901 A | 4/1998 | Entner et al. | 707/103 |
| 5,748,104 A | 5/1998 | Argyroudis et al. | 340/870.11 |
| 5,748,619 A | 5/1998 | Meier | 370/278 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,757,783 A | 5/1998 | Eng et al. | 370/315 |
| 5,768,148 A | 6/1998 | Murphy et al. | 364/492 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,801,643 A | 9/1998 | Williams et al. | 340/870.02 |
| 5,805,712 A | 9/1998 | Davis | 380/50 |
| 5,808,558 A | 9/1998 | Meek et al. | 340/870.01 |
| 5,809,059 A | 9/1998 | Souissi et al. | 375/202 |
| 5,822,521 A | 10/1998 | Gartner et al. | 395/200.6 |
| 5,850,187 A | 12/1998 | Carrender et al. | 340/10.42 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/502 |
| 5,884,184 A | 3/1999 | Sheffer | 455/521 |
| 5,892,758 A | 4/1999 | Argyroudis | 370/335 |
| 5,896,382 A | 4/1999 | Davis et al. | 370/401 |
| 5,897,607 A | 4/1999 | Jenney et al. | 702/62 |
| 5,898,387 A | 4/1999 | Davis et al. | 340/870.02 |
| 5,907,491 A | 5/1999 | Canada et al. | 364/468.15 |
| 5,907,540 A | 5/1999 | Hayashi | 370/315 |
| 5,910,799 A | 6/1999 | Carpenter et al. | 345/333 |
| 5,923,269 A | 7/1999 | Shuey et al. | 340/870.02 |
| 5,926,103 A | 7/1999 | Petite | 340/825.19 |
| 5,926,531 A | 7/1999 | Petite | 379/144 |
| 5,943,375 A | 8/1999 | Veintimilla | 375/355 |
| 5,944,842 A | 8/1999 | Propp et al. | 714/701 |
| 5,953,319 A | 9/1999 | Dutta et al. | 370/238 |
| 5,958,018 A | 9/1999 | Eng et al. | |
| 5,959,550 A | 9/1999 | Giles | 340/870.02 |
| 5,960,074 A | 9/1999 | Clark | 379/310 |
| 5,963,146 A | 10/1999 | Johnson et al. | 340/870.01 |
| 5,974,236 A | 10/1999 | Sherman | 395/200.51 |
| 5,986,574 A | 11/1999 | Colton | 340/870.02 |
| 6,000,034 A | 12/1999 | Lightbody et al. | 713/202 |
| 6,028,522 A | 2/2000 | Petite | 340/641 |
| 6,034,988 A | 3/2000 | VanderMey et al. | 375/202 |
| 6,035,201 A | 3/2000 | Whitehead | 455/455 |
| 6,041,056 A | 3/2000 | Bigham et al. | 370/395 |
| 6,061,604 A | 5/2000 | Russ et al. | 700/90 |
| 6,067,029 A | 5/2000 | Durston | 340/870.03 |
| 6,073,169 A | 6/2000 | Shuey et al. | 709/217 |
| 6,073,174 A | 6/2000 | Montgomerie et al. | 709/224 |
| 6,078,251 A | 6/2000 | Landt et al. | 340/10.41 |
| 6,078,909 A | 6/2000 | Knutson | 705/59 |
| 6,088,659 A | 7/2000 | Kelley et al. | 702/62 |
| 6,091,758 A | 7/2000 | Ciccone et al. | 375/132 |
| 6,100,817 A | 8/2000 | Mason, Jr. et al. | 340/870.02 |
| 6,112,192 A | 8/2000 | Capek | 705/59 |
| 6,124,806 A | 9/2000 | Cunningham et al. | 340/870.02 |
| 6,128,276 A | 10/2000 | Agee | 370/288 |
| 6,137,423 A | 10/2000 | Glorioso et al. | 340/870.02 |
| 6,150,955 A | 11/2000 | Tracy et al. | 340/870.02 |
| 6,154,487 A | 11/2000 | Murai et al. | 375/150 |
| 6,160,993 A | 12/2000 | Wilson | 455/12.1 |
| 6,172,616 B1 | 1/2001 | Johnson et al. | 340/870.12 |
| 6,195,018 B1 | 2/2001 | Ragle et al. | 340/870.01 |
| 6,199,068 B1 | 3/2001 | Carpenter | 707/100 |
| 6,208,266 B1 | 3/2001 | Lyons et al. | 340/870.02 |
| 6,218,953 B1 | 4/2001 | Petite | 340/641 |
| 6,233,327 B1 | 5/2001 | Petite | 379/155 |
| 6,246,677 B1 | 6/2001 | Nap et al. | 370/346 |
| 6,249,516 B1 | 6/2001 | Brownrigg et al. | 370/338 |
| 6,333,975 B1 | 12/2001 | Brunn et al. | 379/106.03 |
| 6,363,057 B1 | 3/2002 | Ardalan et al. | 370/252 |
| 6,393,341 B1 | 5/2002 | Lawrence et al. | 700/286 |
| 6,396,839 B1 | 5/2002 | Ardalan et al. | 370/401 |
| 6,421,731 B1 | 7/2002 | Ciotti, Jr. et al. | 709/238 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,657,549 B1 | 12/2003 | Avery | 340/825.49 |
| 6,684,245 B1 | 1/2004 | Shuey et al. | 709/223 |
| 6,751,563 B2 | 6/2004 | Spanier et al. | 702/61 |
| 6,867,707 B1 | 3/2005 | Kelley et al. | 340/870.02 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |

| | | | |
|---|---|---|---|
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0026957 A1 | 3/2002 | Reyman | 137/39 |
| 2002/0027504 A1 | 3/2002 | Davis et al. | 340/540 |
| 2002/0031101 A1 | 3/2002 | Petite et al. | 370/310 |
| 2002/0094799 A1 | 7/2002 | Elliott et al. | 455/405 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0123442 A1 | 7/2003 | Drucker et al. | 370/392 |
| 2003/0202512 A1 | 10/2003 | Kennedy | 370/389 |
| 2004/0001008 A1 | 1/2004 | Shuey et al. | 340/870.02 |
| 2004/0113810 A1 | 6/2004 | Mason, Jr. et al. | 340/870.02 |
| 2005/0184881 A1 | 8/2005 | Dusenberry et al. | 340/870.02 |
| 2005/0190074 A1* | 9/2005 | Cumeralto et al. | 340/870.02 |
| 2005/0270173 A1 | 12/2005 | Boaz | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 | 3/1990 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |
| WO | WO 2004004364 A2 | 1/2004 |

OTHER PUBLICATIONS

Markwalter, Brian et al., "CEBus Network Layer Description", IEEE, 1989, 571-575.
Newtown, Harry, Newton's Telecom Dictionary, Flatiron Publishing, Inc., 10th Ed., 1996, LAN (1 of 1): Cebus Overview (1-3): Cebus Industry Council (1 of 1).
Newtown, Harry, Newton's Telecom Dictionary, 10th Edition, 1996, 243.
International Search Report issued in International Application No. PCT/US98/11170 Date of Mailing: Oct. 7, 1998.
International Search Report issued in International Application No. PCT/US98/19034 Date of Mailing: Feb. 1, 1999.
Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.
Internet Printout, http://www.ardis.com "Ardis Two-Way, Wireless Data Communications," Ardis, Sep. 23, 1998.
Internet Printout, http://www.ardis.com/RADIO "An Overview of Radio Coverage," Sep. 29, 1998 "Radio Propagation," Sep. 29, 1998 "Factors Affecting Ardis Coverage," Sep. 29, 1998 "The Ardis Network Compared to Other Systems," Sep. 29, 1998.
Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.
"MV-90 Read Only System" UTS Software Solutions For Utility Customers. (No Date). (No Page Numbers or Pages).
Rappaport, T. S., "Wireless Communications, Principles and Practice," Prentice Hall PTR, 1996, pp. 410-413.
Brochure: TRF6900 Single-Chip RF Transceiver, Texas Instrument, 2001 ©.
Corcoran, P.M. et al., "CEBus Network Access via the World-Wide-Web", International Conference on Consumer Electronics, Jun. 5-7, 1996, 236-237, XP-002218722.
Corcoran, P.M. et al., "Browser-Style Interfaces to a Home Automation Network", IEEE Trans. On Consumer Electronics, Nov. 1, 1997, 43(4), 1063-1069, XP-000768559.
Norenkov, et al., Telecommunication Technologies and Networks, Moscow Bauman Technical School, 1988, (Signed for publication on Dec. 10, 1997), pp. 116-118, 80-87 [1] English Language Abstract Provided.
Brownrigg, E. Ph.D., "Developing the Information Superhighway Issues for Libraries", Library Perspectives on NREN, The National Research and Education Network, 1990, 55-63.
Brownrigg, E.B., "The Internet as an External Economy: The Emergence of the Invisible Hand", Library Administration and Management, 1991, 95-97.
Frankel, M.S., "Packet Radios Provide Link for Distributed, Survivable C3 in Post-Attack Scenarios", MSN, Jun. 1983, 80-108.
Gower, N. et al., "Congestion Control Using Pacing in a Packet Radio Network", IEEE Military Communications Conference, 1982, 1, 23.1-1, 23-1-6.
Jubin, J., "Current Packet Radio Networks Protocols", IEEE Infocom Proceedings, 1985, 86-92.
Kahn, R.E., "The Organization of Computer Resources into a Packet Radio Network", IEEE Transactions on Communications, 1977, 25(1), 169-178.
Kahn, R.E., et al., "Advances in Packet Radio Technology", proceedings of the IEEE, 1978, 66(11), 1468-1496.
Lauer, G. et al., "Survivable Protocols for Large Scale Packet Radio Networks", IEEE Global Telecommunications Conference, 1984, 468-471.
Lynch, C.A. et al., "Electronic Publishing, Electronic Imaging, and Document Delivery", Electronic Imaging, International Electronic Imaging Exposition & Conference, 1986, 662-667.
Lynch, C.A. et al., "The Telecommunications Landscape", 1986, 7 pages.
Lynch, C.A. et al., "Routing, Repeating, Power Control and Directional Techniques", Packet Radio Networks, Architectures, Protocols, Technologies and Applications, 1987, Ch 5, 105-129, 259-274.
MacGregor, W. et al., "Multiple Control Stations in Packet Radio Networks", IEEE Military Communications Conference, 1982, 10.3-1-10.3-5.
Shachan, N. et al., "A Packet Radio Network for Library Automation", IEEE Military Communications Conference, 1987, 2, 21.3.1-21.3.7.
Shacham, N. et al., "Future Directions in Packet Radio Technology", IEEE Infocom Proceedings, 1985, 93-98.
Westcott, J.A., "Issues in Distributed Routing for Mobile Packet Radio Networks", IEEE, 1982, 233-238.
Wescott, J. et al., "A Distributed Routing Design for a Broadcast Environment", IEEE Military Communications Conference, 1982, 10.4-1-10.4-5.
"Packet Radio: Applications for Libraries in Developing Countries", UDT Series on Data Communication Technologies and Standards for Libraries, 1993, Ch 1-6, 87 pages.
Chlamtac, I. et al., "Optimizing the System of Virtual Paths", IEEE ACM Transactions on Networking, 1994, 2(6), 581-586.
Leung, V.C.M., "Internetworking Wireless Terminals to Local Area Networks Via Radio Bridges", ICWC, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

In The United States Patent and Trademark Office: Non-Final Office Action in U.S. Appl. No. 11/355,690, filed Feb. 16, 2006, 10 pages.

In The United States Patent and Trademark Office: Reply Transmittal Letter in Reply Responsive to Office Action dated Nov. 6, 2007 in U.S. Appl. No. 11/355,690, filed Feb. 16, 2006, Dated Apr. 7, 2008, 4 pages.

* cited by examiner

IN-HOME DISPLAY COMMUNICATES WITH A FIXED NETWORK METER READING SYSTEM

FIELD OF THE INVENTION

The present invention relates to a display system, and more particularly, to a display and systems and methods for retrieving information from a fixed network meter reading system.

BACKGROUND OF THE INVENTION

An automated means for collecting meter data involves a fixed wireless network. Devices such as, for example, repeaters and gateways are permanently affixed on rooftops and pole-tops and strategically positioned to receive data from enhanced meters fitted with radio-transmitters. Typically, these transmitters operate in the 902-928 MHz range and employ Frequency Hopping Spread Spectrum (FHSS) technology to spread the transmitted energy over a large portion of the available bandwidth. Data is transmitted from the meters to the repeaters and gateways and ultimately communicated to a central location.

With the increased sophistication of meters and reading techniques has come the corresponding sophistication of billing techniques and amount of information stored within utility meters. For example, energy meters may be operated as either a "demand" meter or as a "time-of-use" (TOU) meter. TOU meters allow a power company to provide greater differentiation by which the energy is billed. Energy metered during peak hours will be billed differently than electrical energy billed during non-peak hours. Also, demand meters allow for a billing charge based on the maximum amount of power consumed in a given period of time (e.g., 15 minutes). As a result, energy meters contain a significant amount of information that is useful to consumers.

In-home display concepts for home automation systems have been available for quite some time. Communications from the utility meter to the display have been accomplished with a variety of different technologies, ranging from low speed power line carrier to broadband RF. The communication requirements are typically guided by the sophistication of the home automation system, which vary from basic functionalities to full consumer service offerings. Historically, the high cost of providing information to in-home displays has prevented nearly all system approaches from gaining significant installation quantities.

Therefore, there is a need to provide an in-home display that implements a low cost communications system that is compatible with existing technologies and which provides energy consumption information, etc. to the residential customer. The present invention provides such a system.

SUMMARY OF THE INVENTION

The invention provides a system and method for providing an in-home display that receives information from energy meters via a wide area network approach using, e.g., FHSS techniques. The display communicates with existing automated meter reading communications systems to provide information to a user. The display includes a radio that listens to communications between a utility meter and the reading system. When the display recognizes a particular utility meter identifier, it captures meter read information and stores it in memory. The information may then be presented to the user. Alternatively, a broadcast message may be communicated, that when received by the display, causes the display to extract information from the receiver. A manual override button may be provided to allow a user to manually request information from the meter. The display will extract information from the meter upon receipt of the manual request.

The display may also retrieve information using out of band techniques. Here the display would communicate with the meter using FHSS channels that are reserved for that purpose. Other channels would be used for normal communication between the meter and the reading system to reduce the likelihood of system degradation. Alternatively, an RF system may be used that is independent of the reading system RF communication system.

These and other novel features will be described in further detail below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-2. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water and gas, may be operable to wirelessly communicate with each other and/or to communicate with one another via a wireline network. A collector may be operable to automatically identify and register meters for communication with the collector. When a meter is installed, the meter becomes registered with the collector that can provide a communication path to the meter. The collectors may receive and compile metering data from a plurality of meter devices via wireless communications. Also, a communications server communicates with the collectors to retrieve the compiled meter data.

Figure 1:
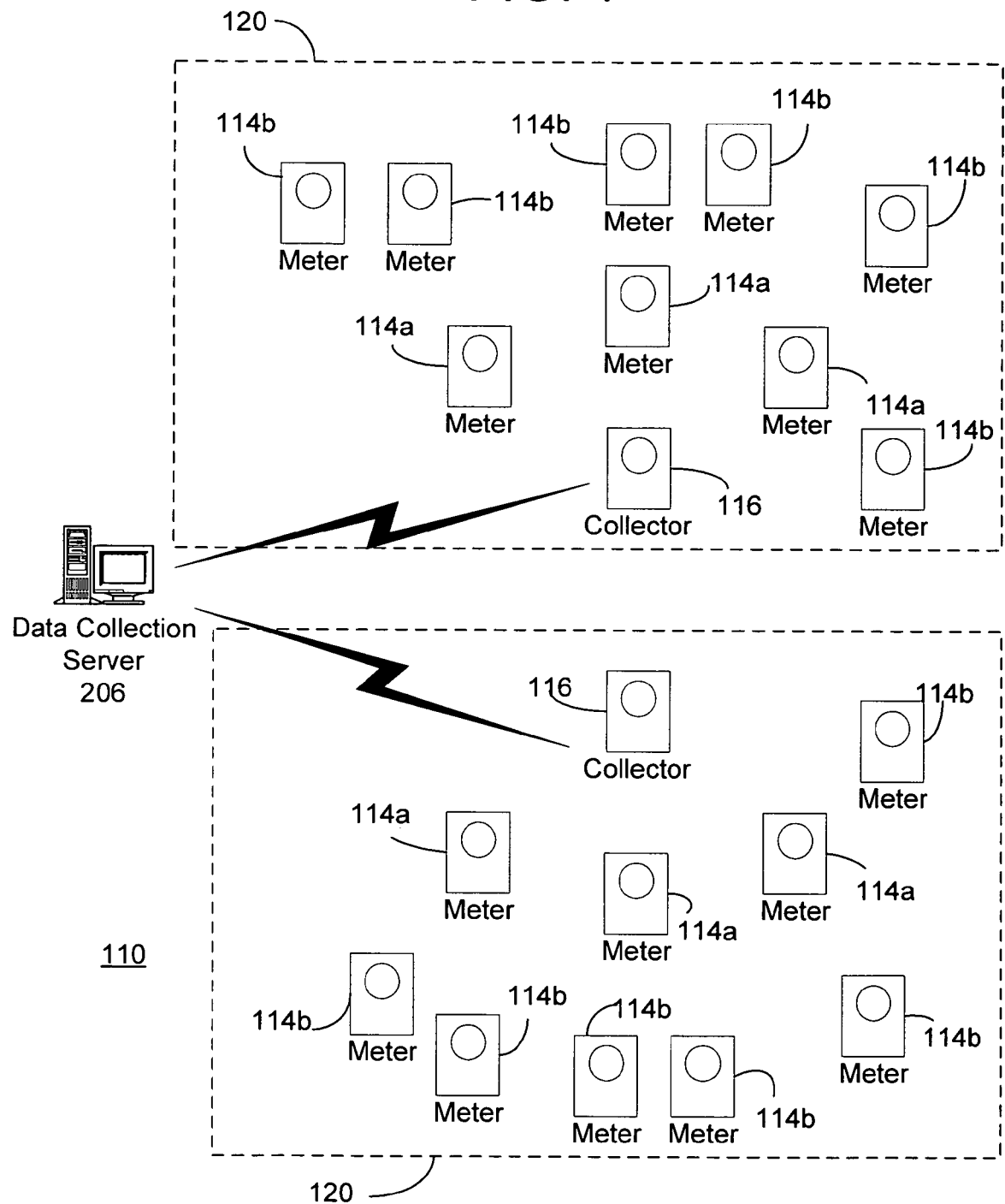
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 may comprise an antenna and may be operable to transmit data, including service usage data, wirelessly or via wired connections. Meters 114 may be further operable to receive data wirelessly as well. In an illustrative embodiment, meters 114 may be, for example, electrical meters manufactured by Elster Electricity, LLC.

System 110 may further comprise collectors 116. Collectors 116 also may be meters operable to detect and record usage of a service or commodity such as, for example, electricity, water, or gas. Collectors 116 may comprise an antenna and may be operable to send and receive data wirelessly. In particular, collectors 116 may be operable to send data to and receive data from meters 114. In an illustrative embodiment, meters 114 and/or collectors 116 may be, for example, an electrical meter manufactured by Elster Electricity, LLC.

A collector 116 and the meters 114 for which it is configured to receive meter data define a subnet/LAN 120 of system 110. In the context of networking, meters 114 and collectors 116 may be considered as nodes in the subnet 120. For each subnet/LAN 120, data may be collected at collector 116 and periodically transmitted to a data collection server 206. The data collection server 206 may store the data for analysis and preparation of bills, for example, among other uses. The data collection server 206 may be a specially programmed general purpose computing system and may communicate with collectors 116 wirelessly or via a wireline connection such as, for example, a dial-up telephone connection or fixed wire network.

Generally, collector 116 and meters 114 may communicate with and among one another using any one of several robust wireless techniques such as, for example, frequency hopping spread spectrum (FHSS) and direct sequence spread spectrum (DSSS). As illustrated, meters 114a may be referred to as "first level" meters that communicate with collector 116, and meters 114b may be referred to as "higher level" meters that communicate with other meters in the network and that forward information to the collector 116.

Figure 2:
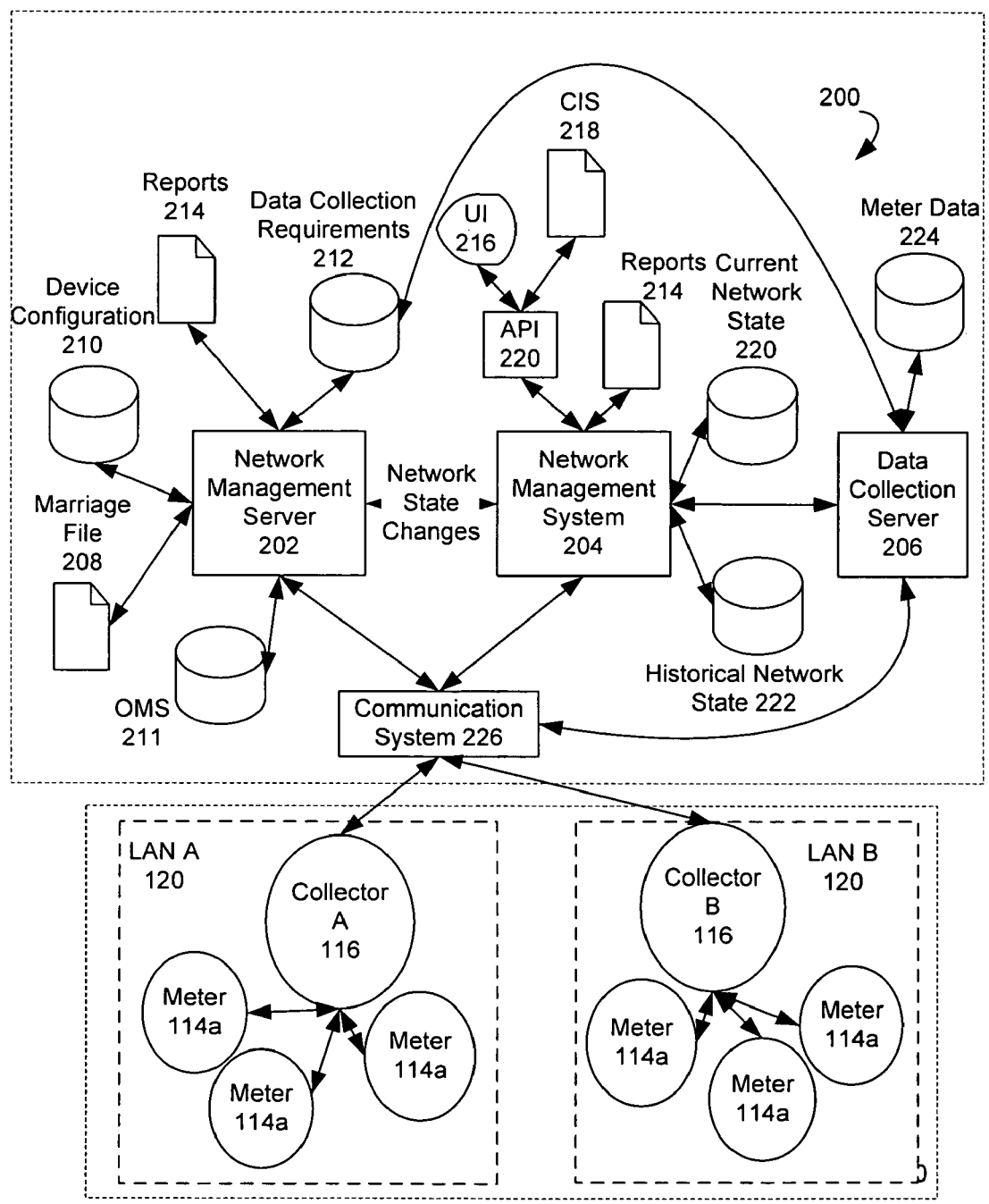
FIG. 2 expands upon the diagram of FIG. 1 and illustrates a system in which the present invention is embodied.

Referring now to FIG. 2, there is illustrated a system 200. The system 200 may include a network management server 202, a network management system (NMS) 204 and a data collection server 206 that together manage one or more subnets/LANs 120 and their constituent nodes. The NMS 204 may track changes in the network state, such as new nodes registering/unregistering with the system 200, node communication paths changing, etc. This information may be collected for each subnet/LAN 120 and may be detected and forwarded to the network management server 202 and data collection server 206.

Communication between nodes and the system 200 may be accomplished using a LAN identification, however customers also may query and communicate with nodes using their own identifier. To this end, a marriage file 208 may be used to correlate a customer serial number, a manufacturer serial number and LAN identification for each node (e.g., meters 114a and collectors 116) in the subnet/LAN 120. A device configuration database 210 may store configuration information regarding the nodes. For example, in the metering system 110, the device configuration database may include data regarding time of use (TOU) switchpoints, etc. for the meters 114a and collectors 116 communicating to the system 200. A data collection requirements database 212 may contain information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

A network management system (NMS) 204 maintains a database describing the current state of the global fixed network system (current network state 220) and a database describing the historical state of the system (historical network state 222). The current network state 220 may contain data regarding current meter to collector assignments, etc. for each subnet/LAN 120. The historical network state 222 may be a database from which the state of the network at a particular point in the past can be reconstructed. The NMS 204 may be responsible for, among other things, providing reports 214 about the state of the network. The NMS 204 may be accessed via an API 220 that is exposed to a user interface 216 and a Customer Information System (CIS) 218. Other external interfaces may be implemented as well. In addition, the data collection requirements stored in the database 212 may be set via the user interface 216 or CIS 218.

The data collection server 206 collects data from the nodes (e.g., collectors 116) and stores the data in a database 224. The data may include metering information, such as energy consumption and may be used for billing purposes, etc. by a utility provider.

The network management server 202, network management system 204 and data collection server 206 may communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

Figure 3:
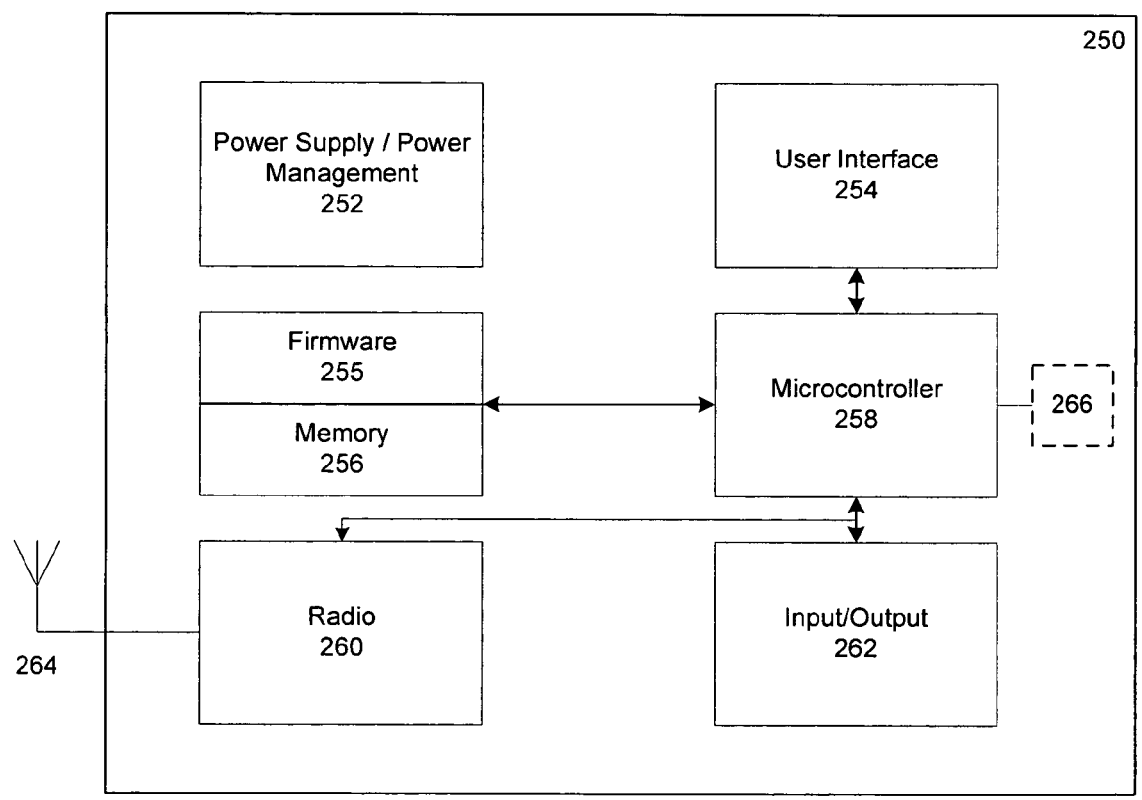
FIG. 3 illustrates an exemplary display device.

Referring now to FIG. 3, an in-home display 250 includes a radio system 260 and antenna 264 to enable it to communicate with meters 114 and collectors 116 using the existing radio infrastructure. As described above, the meters 114 and collectors 116 communicate via, e.g., Frequency Hopping Spread Spectrum radio. By communicating with the existing radio and meter firmware, the in-home display 250 can provide information to a user without significantly impacting the operation and cost of the meter 114/collector 116. Additionally, the meters 114/collectors 116 that are presently installed in the field would be able to support display communications, thus eliminating the need for a costly change-out.

As would be understood by those of ordinary skill in the art, the in-home display 250 also includes a power supply/power management components 252, program firmware 255, memory 256, a microcontroller 258 and an input/output device 262 to enable the in-home display to communicate with other down stream devices (e.g., a hand-held reader, personal computer, etc.). A user interface 254 is also provided in an, e.g., LCD display, to allow an end user to interact with the display 250.

The amount of communications traffic within the system 110 is variable. For example, traffic can be heavy during some meter intervals and during network configuration periods. Other unscheduled events can occur that will also require considerable communication traffic. One-way devices, such as water and gas meters provide additional random traffic. The collector 116 typically controls communication traffic within a subnet/LAN 120 so that communication contention is reduced as much as possible.

To minimize contention with normal traffic, the collector 116 preferably controls the communications to the display 250. In general, if the collector 116 has control of the majority of display communications, the collector 116 can coordinate the meter reading and utility operational communications with the display communications. As an example, if meters are read every 4 hours and the total meter read time is 30 minutes, the collector 116 would preferably prevent display traffic during this meter read interval.

Normal Traffic Coordination

Figure 4:
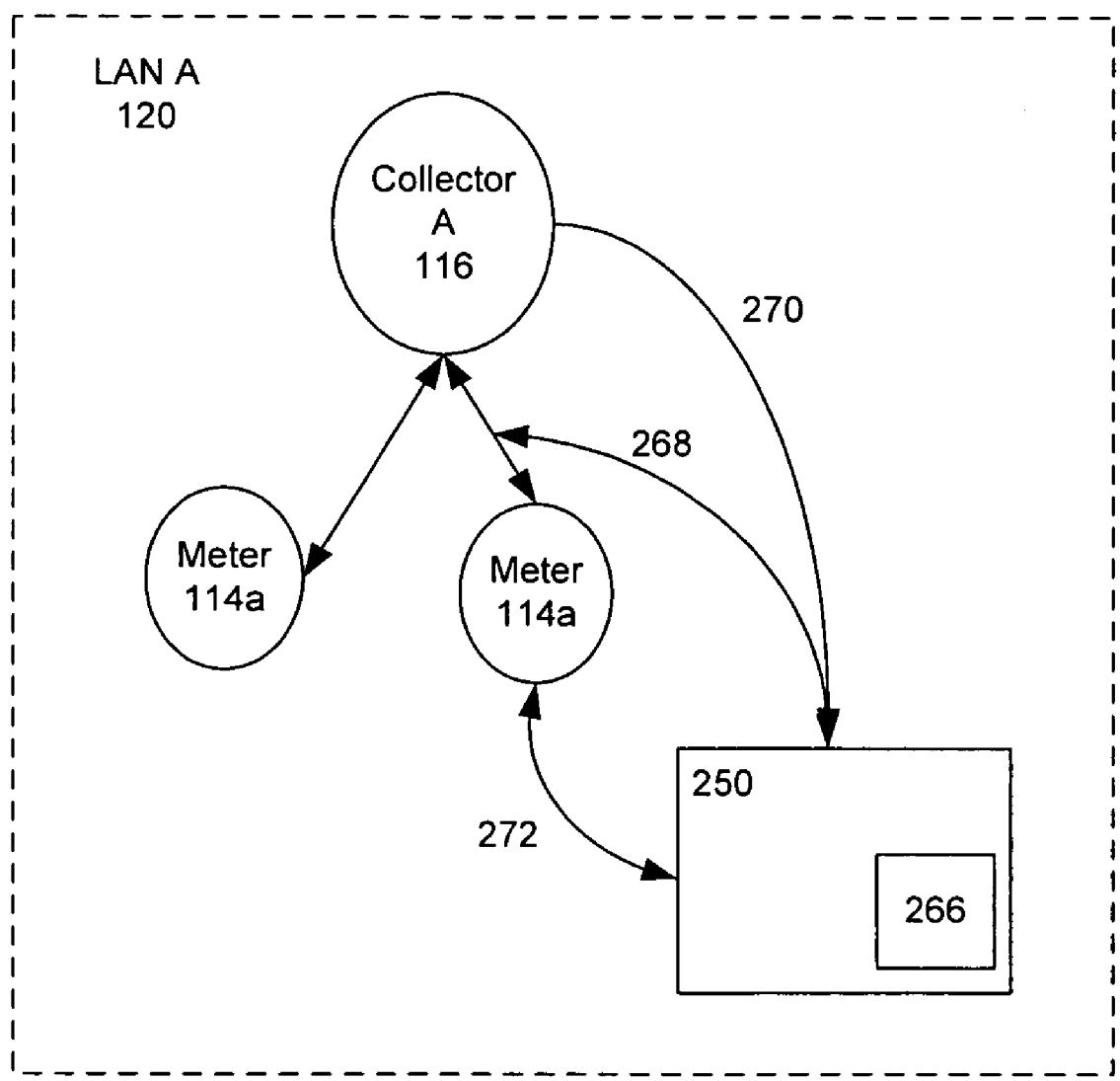
FIG. 4 illustrates exemplary communication links to the in-home display and network elements.

With reference to FIG. 4, for the in-home display 250 to gain a timely update that is correlated to the meter read interval, the display 250 may listen to the normal meter read traffic. When the associated meter 114 transmits its meter data, the display firmware 255 recognizes the meter's unique ID and updates the display memory with the current meter read information (communication link 268). The display 250 may maintain a duplicate copy of the meter's configuration so that information such as "time synch," "tier pricing" or "TOU schedule" is known to the display 250.

However, there may be instances where interference or other operations prevent the display 250 from hearing the normal meter read communication. To account for these circumstances, when the meter read interval is complete, a broadcast message is sent throughout the system 110 that is directed to the in-home displays 250 (communication link 270). The display devices 250 are capable of receiving the broadcast command via the radios 260. After receipt of the broadcast, in-home display firmware 255 randomly or via a schedule extracts required information from it associated meter 114 (communication link 272). The individual displays 250 would be able to randomly select communication time windows in order to minimize contention traffic between displays or the collector could assign slot times. Using above noted solutions, the in-home display update would occur at approximately the same rate as the utility update rate.

The display firmware 255 accesses data from the meter 114 using table-based reads of selected information. Such table-based reads are performed by the collector 116 in its retrieval of information from the meter 114.

A manual override capability may be offered to the residential or commercial owner for the instances where more up-to-date metering data is desired. The display device 250 may optionally include a "read button" 266 that when activated, extracts the most recent meter data. The "read button" functionality may also provide a menuing system to allow the customer to extract more specific meter data than a standard update would provide using link 272. The display firmware 255 may include an override capability to prevent display traffic contention if the button is accidentally pushed multiple times in succession or fails in a mode that requests the update continuously.

In yet another alternative, the in-home display 250 may be placed as a node in the system 110. Here the meter read interval may not be correlated and the in-home display 250 contains the communications bound for the system 200. In this case, the collector 116 would update and read from the meter 114 and would additionally download information to the in-home display 250. This may be accomplished using link 272, where the link is a LAN communications link, such as those used between the collector 116 and the meters 114. Downloaded information could include the last meter read data, "time synch," "tier pricing" or "TOU schedule" information. Additionally, information such as energy pricing could be downloaded to the in-home display 250 to provide an accurate representation of tier or total consumption.

The display firmware 255 may also have the capability to perform mathematical functions related to the metering data extracted from the meter 114. Examples of these functions include, but are not limited to, determining projected monthly usage, expected monthly bill, current rate of usage, comparison of today's or this month's usage to last year, etc. These types of calculations may be provided within the display firmware 255 without any impact on the existing meter firmware.

It is possible that the requirements of the display functionality will require that the collector 116 provide information to the display that is not part of the normal system traffic. This new information may be implemented in the existing communication infrastructure using new meter tables within the meter 114. Communications that write to tables in the in-home displays 250 would be handled by the meters 114 and meter repeaters to provide display devices necessary information related to energy pricing and other nonstandard metering data.

The in-home display 250 may perform the following non-limited functions:

Load Management: Curtailment, Notification, Automation

System Information: Control, Monitor, Outage (detect, record), Faults

Pricing Options: TOU, RTP, History, Tier Indication

Meter Reading: On site, Currency Conversion, Visual Presentations

Remote Disconnect: Status, Load Limiting, Prepay

Payment Notification: Bill, Prepay, Fund Transfer, Average Billing, On Demand

Alarms: Security, Tamper, Errors, Measurements

Load Research: Load Profile History, Payment History (monthly, yearly)

Messaging: Utility Info, Price Quotes, External Environment, Warnings

Metering: Sub-metering, Power Signature, Voltage Monitor

Advanced Functions: Harmonics, Power Factor, Other Energies, Gateway

Out of Band Traffic

There is a possibility that in some environments the communication requirements associated with the in-home display 250 will be quite high (e.g., as often as every minute). If the meter radio is required to spend a significant percentage of the time communicating with the in-home display 250, the result can be a degradation in the meter reading system performance. This degradation can occur because the meter in question will not respond to system reads while in-home communication is occurring. Compounding this problem, is that adjoining meters may not respond to system reads either due to in-band noise being generated by in-home communications. If large numbers of meters have in-home communications that are concurrent, the overall noise level may be excessive and meter reading system performance could suffer.

A typical communication consists of a 65-msec preamble followed by a 16-bit start frame delimiter and then a packet. The 65-msec preamble, SFD and packet are sent on one frequency out of the 25 channels used by the system. The 65-msec preamble allows sufficient time for an asynchronous receiver to scan all 25 possible channels with a redundant algorithm. FCC Part 15.247 focuses on an equitable distribution of energy across the spectrum in question. In the system 110, the spectrum is 902-915 MHz and equal distribution is managed by insuring each packet is sent on a different frequency. A frequency is not repeated until all 24 others have been utilized by a given transmitter. The total ISM band is 902-928 MHz, though, so there are another 30 channels in the total ISM band that can be utilized.

An approach for display communications in the ISM frequency spectrum that alleviates the above problem may be a system where the meter 114 sends display packets that use a selection of the 25 higher frequency channels. In an embodiment of this scheme, the display receiver 260 would begin by looking for channel 26. Similarly, the meter transmitter would begin with frequency 26 to send a display packet. Once the display receiver 260 detects channel 26 it decodes the data and determines the transmitter timing such that it can stay in lock step with the meter 114. This serves to minimize the amount of time spent on any given display packet relative to the 65-msec preamble time for the lower frequency channels. Further, if display communications is accomplished on the upper channels, the meter 114 and display 250 would have the same random list of channels to select from and would synchronously step through the channels to keep the energy in each higher channel equal.

Assuming the display receiver is able to change channels and lock in 0.5 msec, a 32-bit display packet should be able to be executed in less than 5 msec. With this limited amount of transmission time, display packets should have minimal impact on communications in the system 110. With changes to the meter firmware, the meter could be limited such that it will not send a display packet until a scan algorithm is complete. This restriction would further insure the display packet should not prevent the meter from receiving a valid message.

With the above firmware programming, the system 110 operates normally for LAN communications and the meter 114 occasionally transmits a short segment of a display packet outside of the LAN 25-channel spectrum. By being properly time synchronized, the display receiver 260 would be able to handle lower band communications or receive higher band display communications. The display transceiver 260 would have the capability to transmit standard packets as well. This type of system would allow the in-home display 250 to be programmed, configured or read from the collector 116 through the conventional mesh network 110 and would also allow the display to receive one-way burst updates from the meter 114 when the display refresh rate requirement was high. If two-way communication is necessary between the display 250 and the meter 114, it could be scheduled or if it is random enough, it could be accomplished on the assumption the contention would be minimal.

Alternate RF Communication

To eliminate any possibility of contention that would degrade system performance, an alternate RF or powerline technology could be implemented within the meter 114 and the in-home display 250. The intelligence for this alternate communication system is preferably independent of the meter radio controller, so in-home display traffic will have no impact on the traffic in the system 110. By using a standard radio or powerline technology there is significant opportunity to reduce display system costs.

In order to minimize the impact on system communications, the selected alternate RF or powerline technology should not impact the 902-928 MHz wireless band. An ISM solution in the 2.4 GHz wireless spectrum or broadband wired solution appears to offer the best compromise between performance, cost and industry standardization. The ZIGBEE network built on top of the IEEE 802.15.4 physical and MAC layers is an exemplary suitable alternative RF technology. The Homeplug powerline solution is a typical standard wired technology.

The alternate radio or powerline technology in the meter is preferably coupled to a microprocessor that can process the network traffic without burdening the meter intelligence. By incorporating a second communication processor the in-home display traffic will be off-loaded from the meter micro to further guarantee no contention for the system 110. Data coordination between the two networks should be handled with a standard digital interface like Rx/Tx, SPI or $I^2C$.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims.

For example, although a great deal of the discussion was based on the use of certain devices and communication paths, it should be appreciated that the contemplated embodiments include the use of any devices, communication paths and techniques. Moreover, although device configurations have been described herein, it should be appreciated that the devices are provided merely to provide an understanding of the many techniques contemplated by the embodiments. Those skilled in the art, having the benefit of the teachings of this specification, may affect numerous modifications thereto and changes may be made without departing from the scope and spirit of the invention.

What is claimed is:

1. A method of providing commodity consumption information to a user via a remote display, comprising:
   communicating with a utility meter associated with the remote display, wherein the associated utility meter is part of a wireless network comprising a collector and a plurality of utility meters that bi-directionally communicate wirelessly with the collector, each of the utility meters having a wireless communication path to the collector that is either a direct communication path to the collector or an indirect communication path through one or more other utility meters that serve as repeaters, and the collector receiving commodity consumption information from the plurality of utility meters;
   wirelessly retrieving commodity consumption information from the associated utility meter by the remote display in response to a message from the collector received by the remote display, wherein the message received from the collector controls the time at which commodity consumption information is retrieved from the associated utility meter by the remote display; and
   updating the remote display with said commodity consumption information.

2. The method of claim 1, further comprising maintaining a duplicate copy of configuration information of said utility meter.

3. The method of claim 2, said configuration information comprising at least one of time synch, tier pricing, and a TOU schedule.

4. The method of claim 1, wherein said communicating with said associated utility meter comprises:
   recognizing an identifier of said associated utility meter; and
   updating memory with current meter read information from said associated utility meter.

5. The method of claim 1, wherein the message received from the collector is broadcast by the collector via the wireless network.

6. The method of claim 1, wherein the message received from the collector is wirelessly transmitted by the collector on a frequency that is not used by the utility meters of the automated meter reading system to bi-directionally communicate with the collector.

7. The method of claim 1, further comprising retrieving commodity consumption information from said associated utility meter in response to receipt of a manual read request.

8. The method of claim 7, further comprising:
   providing a user interface on said display in response to said manual read request; and providing a selection of types of information to be retrieved by said display in response to a user input.

9. The method of claim 1, further comprising:
manipulating said commodity consumption information to determine supplemental information, said supplemental information comprising at least one of projected commodity usage, a bill for a predetermined time period, and a comparison of commodity usage for first period versus a second period.

10. A remote display that communicates with an automated meter reading system, the automated meter reading system comprising a collector and a plurality of utility meters that bi-directionally communicate wirelessly with the collector, each of the utility meters having a wireless communication path to the collector that is either a direct communication path to the collector or an indirect communication path through one or more other utility meters that serve as repeaters, and the collector receiving commodity consumption information from the plurality of utility meters, the remote display comprising:
memory for storing commodity consumption data;
firmware containing executable instructions for receiving commodity consumption data from an associated utility meter of said automated meter reading system;
a microcontroller; and
a radio adapted to retrieve commodity consumption data from the utility meter associated with the remote display in response to a message received from the collector of said automated meter reading system, wherein the message received from the collector controls the time at which commodity consumption information is retrieved from the associated utility meter by the remote display.

11. The display as recited in claim 10, wherein the message received from the collector is wirelessly transmitted by the collector on a frequency that is not used by the utility meters of the automated meter reading system to bi-directionally communicate with the collector.

12. The display as recited in claim 11, wherein the message received from the collector is broadcast by the collector via the wireless network.

13. The display as recited in claim 10, farther comprising a manual read control, wherein said commodity consumption information is retrieved from said associated utility meter in response to receipt of an input via said manual read control.

14. The display as recited in claim 10, wherein said automated meter reading system utilizes Frequency Hopping Spread Spectrum (FHSS) communications having a predetermined number of channels, and wherein said radio utilizes a first subset of said number of channels in which to communicate with said utility meter.

15. The display as recited in claim 14, wherein said display communicates with said automated meter reading system utilizing a second subset of said number of channels, said second subset of channels not intersecting said first subset of channels.

16. An automated meter reading system comprising:
a collector;
a plurality of utility meters that bi-directionally communicate wirelessly with the collector, each of the utility meters having a wireless communication path to the collector that is either a direct communication path to the collector or an indirect communications path through one or more other utility meters that serve as repeaters, the plurality of utility meters transmitting commodity consumption data to the collector and the collector transmitting control information to the utility meters; and
at least one in-home remote display device comprising:
memory for storing commodity consumption data;
firmware containing executable instruction for receiving commodity consumption data from an associated utility meter of said automated meter reading system;
a microcontroller; and
a radio adapted to retrieve commodity consumption data from the utility meter associated with the remote display in response to a message received from the collector of said automated meter reading system, wherein the message received from the collector controls the time at which commodity consumption information is retrieved from the associated utility meter by the remote display.

17. The display as recited in claim 16, wherein the message received from the collector is wirelessly transmitted by the collector on a frequency that is not used by the utility meters of the automated meter reading system to bi-directionally communicate with the collector.

18. The display as recited in claim 16, wherein the message received from the collector is broadcast by the collector via the wireless network.

19. The display as recited in claim 16, further comprising a manual read control, wherein said commodity consumption information is retrieved from said associated utility meter in response to receipt of an input via said manual read control.

20. The display as recited in claim 16, wherein said automated meter reading system utilizes Frequency Hopping Spread Spectrum (FHSS) communications having a predetermined number of channels, and wherein said radio utilizes a first subset of said number of channels in which to communicate with said utility meter.

21. The display as recited in claim 20, wherein said display communicates with said automated meter reading system utilizing a second subset of said number of channels, said second subset of channels not intersecting said first subset of channels.

* * * * *